United States Patent [19]

Yamada et al.

[11] Patent Number: 4,749,613
[45] Date of Patent: Jun. 7, 1988

[54] COMPOSITE FIBER REINFORCED THERMOPLASTIC RESIN STAMPABLE SHEET AND BUMPER BEAM FORMED THEREOF

[75] Inventors: Toshio Yamada, Tsu; Ikuo Okubayashi, Taki; Yukio Sato; Shunpei Minagawa, both of Mie; Masaru Koshimoto, Ichihara, all of Japan

[73] Assignees: Nippon Sheet Glass Co., Ltd.; Idemitsu Petrochemical Co., Ltd., both of Tokyo, Japan

[21] Appl. No.: 943,527

[22] Filed: Dec. 18, 1986

[30] Foreign Application Priority Data

Dec. 26, 1985 [JP] Japan .................. 60-297293
Nov. 28, 1986 [JP] Japan .................. 61-283276

[51] Int. Cl.⁴ .................................. B32B 5/12
[52] U.S. Cl. ........................ 428/286; 428/287; 428/288; 428/294; 428/300; 428/358
[58] Field of Search ............... 428/284, 286, 287, 290, 428/294, 288, 300, 358

[56] References Cited

U.S. PATENT DOCUMENTS 4,604,319  8/1986  Evans et al. .................. 428/294

Primary Examiner—Marion C. McCamish
Attorney, Agent, or Firm—Frank J. Jordan; C. Bruce Hamburg; Manabu Kanesaka

[57] ABSTRACT

A composite fiber reinforced thermoplastic resin stampable sheet, which comprises laminates each composed of reinforcing fibers arranged in one direction and fiber mats and a thermoplastic resin incorporated in the laminates through impregnation, which stampable sheet is characterized by the fact that the proportion of the reinforcing fibers in the laminates is in the range of 30 to 80% by weight and the laminates are contained in a proportion in the range of 20 to 70% by weight and the thermoplastic resin is contained in a proportion in the range of 30 to 80% by weight respectively. A stampable beam is produced by forming the stampable sheet with a stampable device.

14 Claims, 3 Drawing Sheets

COMPOSITE FIBER REINFORCED THERMOPLASTIC RESIN STAMPABLE SHEET AND BUMPER BEAM FORMED THEREOF

FIELD OF THE INVENTION AND RELATED ART STATEMENT

This invention relates to a composite fiber reinforced thermoplastic resin stampable sheet and a bumper beam obtained by forming the sheet and more particularly to a thermoplastic resin stampable sheet having fibers arranged therein in one direction and enabled to reinforce the sheet in the direction of their arrangement so that the stampable sheet will suit production of stamped articles, particular automobile structural parts, which are required to exhibit mechanical strength in one direction and to a bumper beam obtained by forming the stampable sheet.

Heretofore, bumpers made of metals have been used mostly as shock absorbers in vehicles, particularly automobiles. For preventing vehicles from damage to their bodies owing to collision, such metallic bumpers require use of metallic sheets of a relatively large wall thickness and, therefore, acquire fairly great weight and proportionately increase fuel consumption. Further, the metallic bumpers have a disadvantage that, in case of collision, they undergo plastic deformation and impair the overall appearance of vehicles using the bumpers. They are liable to propagate the impact of collision even into the interiors of vehicles and consequently expose passengers inside the vehicles to injuries and possibly aggravate accidents.

Various improvements have been proposed for the purpose of enabling the metallic bumpers to acquire enhanced rigidity. All these improved bumpers, however, pose a problem that their production requires complicate and troublesome works such as welding and entails appreciable increase of weight. Moreover, since they are made of metals, they cannot be fully prevented from plastic deformation caused on collision. Since they are deficient in corrosion-proofness as evinced by susceptibility to rusting formation of rust, their maintenance calls for great efforts.

For the purpose of removing such drawbacks of metallic bumpers as described above and providing a bumper excelling in mechanical properties, particularly rigidity and shock resistance, and an appreciably reduced in weight, the inventors formerly developed a vehicular bumper beam made of a reinforced thermoplastic sheet and filed this invention for patent (Utility Model Application Disclosure SHO 57(1982)-174,153).

The fiber reinforced thermoplastic resin stampable sheet has been heretofore known to the art (as disclosed in British Pat. No. 2,040,801A, for example). A glass fiber reinforced thermoplastic resin stampable sheet is produced by superposing a thermoplastic resin sheet and a swirled glass fiber mat, for example, as a reinforcing material, heating the superposed layers thereby melting the aforementioned thermoplastic resin, pressing the superposed layers thereby allowing the glass fiber mat to be impregnated with the molten resin, and allowing the superposed layers as kept to be cooled and solidified. The stampable sheet produced consequently can be easily formed with a press of a prescribed shape to give a finished product such as a bumper beam.

The conventional fiber reinforced thermoplastic resin stampable sheet is such that, in a given plane thereof, no difference of strength occurs in the longitudinal direction and the direction perpendicular thereto. It, therefore, has a disadvantage that when it is used in a product such as a bumper which does not require very high strength in the direction prependicular to the longitudinal direction and does require appreciably high mechanical strength in the longitudinal direction, it can satisfy the strength in the direction perpendicular to the longitudinal direction and cannot satisfy the strength in the longitudinal direction.

OBJECTS AND SUMMARY OF THE INVENTION

An object of this invention is to eliminate the drawbacks suffered by the prior art as described above and a composite fiber reinforced thermoplastic resin stampable sheet suitable for the production of a shaped article such as a bumper beam which requires high mechanical strength in one direction and a bumper beam to be formed of the stampable sheet.

This object is accomplished by a composite fiber reinforced thermoplastic resin stampable sheet comprising a laminate composed of reinforcing fibers arranged in one direction and a fiber mat and a thermoplastic resin distributed in the laminate by means of impregnation, which stampable sheet is characterized by the fact that the proportion of the aforementioned reinforcing fibers in the aforementioned laminate is in the range of 30 to 80% by weight and the aforementioned laminate is contained in a proportion of 20 to 70% by weight and the aforementioned thermoplastic resin in a proportion in the range of 30 to 80% by weight. The object is further accomplished by a bumper beam obtained by forming the aforementioned composite fiber reinforced thermoplastic resin stampable sheet.

DETAILED DESCRIPTION OF THE PREFERRED EMBODIMENTS

Now, this invention will be described in detail below.

The composite fiber reinforced thermoplastic resin stampable sheet comprises a laminate composed of reinforcing fibers arranged in one direction (hereinafter referred to at times as "arranged fibers") and a fiber mat and a thermoplastic resin distributed in the laminate by means of impregnation. This stampable sheet is such that the proportion of the aforementioned reinforcing fibers in the laminate is in the range of 30 to 80% by weight and the aforementioned laminate is contained in a proportion in the range of 20 to 70% by weight and the aforementioned thermoplastic resin in a proportion in the range of 30 to 80% by weight respectively.

Examples of the thermoplastic resin which is usable for this invention include polypropylene, polyethylene terephthalate, polybutylene terephthalate, polyamide, and polyphenylene sulfide (PPS).

Examples of the arranged fibers which are usable in this invention include glass fibers, carbon fibers, and aramid fibers such as Kevlar of Du Pont. As the fiber mat, a swirled continuous strand using the aforementioned fibers can be used.

The fiber mat and the arranged fibers may be a combination of materials of one and the same kind or a combination of materials of different kinds. These arranged fibers and the aforementioned fiber mat are desired to be laminated by mechanically bound through needling.

For the purpose of this invention, the reinforcing fibers are desired to be arranged in one direction as parallelly and linearly as permissible. For this purpose, it is advantageous to use not split strands but those strands which are taken up without being mutually joined. As a strand robing answering the description, it is desirable to use robings of 100 to 2,000 filaments, for example, a plurality of unsplit robings each of about 400 filaments arranged parallelly to one another.

As fibers for the fiber mat such as a swirled mat, strands obtained by drawing 200 to 2,000 glass filaments in an unsplit form or in a form split each into not more than 8 pieces from a bushing provided with 200 to 2,000 chips and bundling the drawn filaments while spraying them with a binder are used. In the swirled mat formed of these strands, the swirls of the strands are desired to have diameters roughly in the range of 150 to 800 mm.

Figure 1:
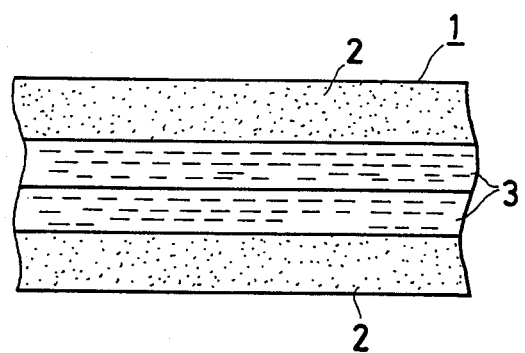
FIG. 1 is a cross section illustrating a typical fiber laminate of a composite fiber reinforced thermoplastic resin stampable sheet.

In the present invention, the pattern in which the laminate of the reinforcing fibers arranged in one direction and the fiber mat is formed is not particularly defined. For the sake of preventing the produced sheet from warping, however, the laminate is desired to be formed symmetrically in the direction of thickness relative to the center of the laminate. For example, a laminate 1 which is formed by superposing fiber mats 2 on the opposite sides of an intervening layer of arranged fibers 3 as illustrated in FIG. 1 has a desirable construction. Otherwise, layers of arranged fibers may be superposed on the opposite sides of an intervening fiber mat conversely to the construction illustrated in FIG. 1.

The construction of the laminate is suitably decided, depending on the purpose for which the produced stampable sheet is to be used, for example. Since the fiber mat is impregnated with a larger amount of resinous component than the arranged fibers, in an application wherein two stampable sheets are required to be mutually fused thermally, the laminate formed by disposing fiber mats impregnated more with the resinous component one each on the opposite sides of the layer of arranged fibers as illustrated in FIG. 1 is used more advantageously because of greater ease of thermal fusion of the stampable sheets. In contrast, the laminate having arranged fibers in the outer layers superposed on the opposite sides of an intervening fiber mat can have an effect of improving the strength of the produced stampable sheet.

The laminate 1 illustrated in FIG. 1 has a four-layer construction consisting of a fiber mat 2, a layer of arranged fibers 3, another layer of arranged fibers 3, and another fiber mat 2. The reason for this particular laminate construction is the efficiency of production derived from the adoption of a procedure which comprises first preparing two-layer laminates each composed of a fiber mat 2 and a layer of arranged fibers 3 and then superposing two such laminates on each other in such a manner that the fiber mats 2 will form the outer layers of the produced sheet. For the present invention, the number of laminates each composed of a fiber mat and a layer of arranged fibers may be 2, 3 or 5 or more.

In the stampable sheet of the present invention, the strength required of the sheet in the longitudinal direction is obtained with difficulty if the amount of reinforcing fibers used therein is too small, whereas the strength required in the direction perpendicular to the longitudinal direction is insufficient if the amount of the aforementioned fibers is too large. Thus, the amount of the fibers is desired to fall in the range of 30 to 80% by weight, based on the amount of the laminate.

An excessively small amount of the laminate in the sheet results in a decline of the mechanical strength of the product and an excessively large amount of the laminate results in difficulty in the formation of the sheet by stamping. Desirably, therefore, the amount of the laminate in the sheet falls in the range of 20 to 70% by weight and the amount of the thermoplastic resin in the sheet in the range of 30 to 80% by weight.

The stampable sheet contemplated by this invention is produced as follows, for example.

First, laminates are prepared each by joining a fiber mat and a layer of arranged fibers. Specifically, some hundred to some thousand fiber strands are fed out onto a belt conveyor as arrayed substantially parallel to the longitudinal direction of the strands coinciding with the direction of travel of the conveyor. On the fibers thus arranged on the belt conveyor, other fibers are superposed in a swirled state as disclosed in U.S. Pat. No. 4,158,557. Then, the superposed layers consequently formed are needled. In this case, the mat on the opposite side from the needles suffers less from breakage of stands by the needles. Thus, the layer of arranged fibers which is required to possess high strength is formed on the lower side of the laminate (namely on the opposite side from the needles) so that the needles plunge into the superposed layers from the swirled mat side. The laminate formed in this construction proves desirable in the sense that the possibility of decline of strength can be curbed to a greater extent.

Two such laminates consequently prepared in a construction consisting of a layer of arranged fibers and a swirled mat are superposed on each other, by following the procedure described in British Pat. No. 2,040,801A, in such a manner that the layers of arranged fibers will fall inside, while feeding molten polypropylene resin into the interface between the superposed laminates and superposing polypropylene resin sheets on the respective outer surfaces of swirled mats. Then, the resultant superposed layers are heated and pressed to melt the polypropylene resin sheet and impregnate the superposed fiber layers with the molten resin. The heated composite is then cooled to produce a stampable sheet.

Now, a bumper beam of the present invention which is obtained by forming the aforementioned composite fiber reinforced thermoplastic resin stampable sheet of this invention will be described below.

Figure 2:
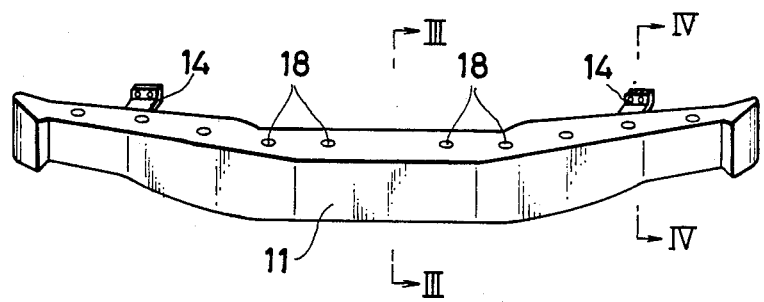
FIG. 2 is a perspective view illustrating the whole construction of a typical bumper beam of this invention.
Figure 3:
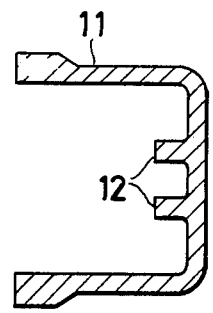
FIG. 3 is a magnified cross section taken along the line III—III in FIG. 2.
Figure 4:
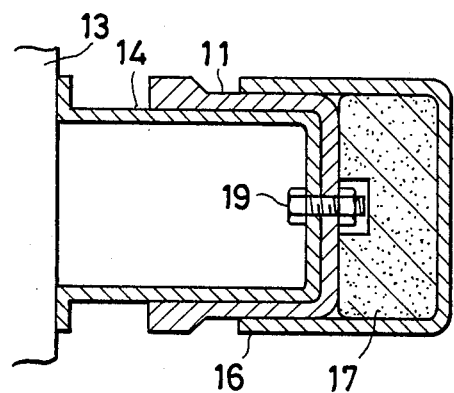
FIG. 4 is a cross section illustrating a typical construction of a bumper.

FIG. 2 is a perspective view illustrating a typical bumper beam embodying the present invention, FIG. 3 is a cross section taken through FIG. 2 along the line III—III, and FIG. 4 is a cross section illustrating the construction for fixing the bumper in position.

A bumper beam 11 of the present embodiment is formed in an oblong shape, with the cross section thereof perpendicular to the longitudinal direction given the shape of three sides of a square as illustrated in FIG. 3. The efficiency of production may be improved by integrally forming support pieces 14 and holes 18 for fitting a rim skin with the bumper beam 11. Optionally, reinforcing ribs 12 for improving the shock resistance of the bumper beam 11 may be integrally formed at a stated position of the bumper beam 11.

From the stampable sheet of this invention described above, the bumper beam of this invention constructed as described above is manufactured preferably as follows. A piece of the stampable sheet having a weight corresponding to the weight of one bumper beam is set in position in metal dies heated in advance to the melting point of the resin used in the sheet in such a manner that the direction of arrangement of the arranged fibers will fall in the longitudinal direction and, then, formed by stamping. In this case, the pressure used for this forming is desired to be not less than 100 kg/cm². Generally, the molding cycle is in the range of 3.0 to 120 seconds. Optionally, the forming can be carried out continuously.

Sometimes, the bumper beam, depending on the shape thereof, may locally have portions of heavy surface irregularities. In the portions of such heavy surface irregularities, the arranged fibers in the stampable sheet do not easily flow along the wavy surface and the resin is not easily distributed sufficiently inside the cavity of the forming dies. Thus, there is a possibility that the produced bumper beam will offer insufficient mechanical strength in these portions. In this case, it is desirable to form the stampable sheet of this invention by stamping after a small sheet of fiber reinforced thermoplastic resin produced by impregnating a thermoplastic resin to a fiber mat, preferably a swirled mat is patched to portions of the sheet having the heavy surface irregularities. The small sheets serve to confer high strength upon the portions of surface irregularities. In this case, the thermoplastic resin and the fibers used in the small sheets of fiber reinforced thermoplastic resin are desired to be the same materials as those used in the stampable sheet of this invention. In the small sheets, the proportion of the fibers to the resin is desired to be such that the fiber mat will account for a content in the range of 20 to 70% by weight and the thermoplastic resin for a content in the range of 30 to 80% by weight.

The bumper beam 11 of the present invention which is manufactured as described above is fixed to one end side of a vehicular body 13 through the medium of a supporting stay 14 having a square cross section with three sides, the open side thereof opposing to the vehicular body 13 as illustrated in FIG. 4. The bumper beam 11 and the stay 14 are joined with nuts and bolts 19.

On the side of the bumper beam 11 to which the stay 14 is not fixed, a skin 16 made of a resin such as polyurethane and formed of three sides with a square cross section and adapted to enclose substantially one side end of the bumper beam 11 is formed. The cavity to be defined by the inner wall of the skin 16 and the one end surface of the bumper beam 11 is filled with foamed polyurethane 17. This shock-absorbing filler may be made of other expanded plastic than the foamed polyurethane or a rubbery elastomer or a honeycomb. For the sake of weight reduction, the expanded plastic such as foamed polyurethane proves most desirable.

The reinforcing fibers used in the composite fiber reinforced thermoplastic resin stampable sheet of the present invention is the laminate composed of fibers arranged in one direction and fiber mats. Besides the fiber mats which in themselves possess an outstanding reinforcing effect, the arranged fibers manifest a highly satisfactory reinforcing effect in the direction of their arrangement. Thus, as a material for forming oblong part such as a bumper which is required to offer high strength in a specified direction, the stampable sheet can provide such products with outstanding mechanical strength.

The bumper beam of this invention which is obtained by forming the stampable sheet of this invention as described above enjoys the following characteristic qualities.

(1) It possesses extremely high safety because it is excellent in mechanical properties, particularly in rigidity and shock resistance in the longitudinal direction.
(2) It exhibits high resilience when it sustains a dent from an external impact and, therefore, does not readily yield to plastic deformation.
(3) When the bumper beam sustains a fracture as on collision, the served parts thereof do not produce flying fragments or sharp broken edges. Thus, the bumper beam warrants safety even in case of an accident.
(4) Unlike the metallic bumper which requires complicate operational steps such as welding, the bumper beam of this invention can be produced by one-shot step of stamping. Thus, the production is very easy and highly efficient.
(5) It permits an appreciable reduction of weight and fuel consumption for an automobile. Thus, it fills the demand for saving of natural resources.

Now, the present invention will be described below with reference to working examples.

EXAMPLES 1-3

First a laminate was prepared by using, as reinforcing fibers, glass strands each formed by bundling 1,000 glass fibers 23μ in diameter and, as fiber mats, strands each formed by bundling 800 glass fibers 23μ in diameter split into 8 pieces.

First, the aforementioned reinforcing strands arrayed substantially parallel to one another were fed out onto a conveyor in such a manner that the longitudinal direction of the strands would coincide with the direction of travel of the conveyor. On the aforementioned mat strands arranged as described above, the aforementioned fiber mat strands were superposed in a swirled state as described in U.S. Pat. No. 4,158,557. The swirled mat and the arranged strands were then mechanically bound to give rise to an integral laminate. This laminate was produced in such a manner that the swirled mat accounted for 50% by weight and the arranged fibers for 50% by weight respectively.

As the thermoplastic resin, polypropylene sheets were used in varying amounts such as to give varying glass contents, 30% by weight (Example 1), 40% by weight (Example 2), and 50% by weight (Example 3), respectively to the resulting laminates. The laminate and the sheet were nipped in a superposed state between two stainless steel plates, pressed at 230° C. for 3 minutes to have the laminate impregnated with the resin, then inserted in a cooling press held in advance at 50° C. to be cooled and solidified. Consequently, there was produced a stampable sheet 2 to 4 mm in wall thickness. This stampable sheet was tested for mechanical strength.

The results were as shown in Table 1.

EXAMPLES 4-6

Stampable sheets were produced by following the procedure of Examples 1-3, excepting the swirled mat: arranged fibers ratio was changed to 40:60 (% by weight). They were tested for mechanical strength.

The results were as shown in Table 1.

EXAMPLE 7

A stampable sheet was produced by following the procedure of Example 3, excepting the swirled mat: arranged fibers ratio was changed to 30:70 (by weight ratio). It was tested for mechanical strength.

The results were as shown in Table 1.

Comparative Experiments 1-3

Stampable sheets were produced by following the procedure of Examples 1-3, excepting only swirled mats were used (with no arranged fibers used). They were tested for mechanical strength.

The results were as shown in Table 1.

TABLE 1

| Example | | Content of arranged fibers (% by weight) | Content of glass component (% by weight) | Direction of arrangement | | | | |
|---|---|---|---|---|---|---|---|---|
| | | | | Tensile strength (kg/cm$^2$) | Modulus of tensile elasticity (kg/cm$^2$) | Bending strength (kg/cm$^2$) | Modulus of bending elasticity (kg/cm$^2$) | Izod impact strength (kg·cm/cm) |
| Example | 1 | 50 | 30 | 1070 | 38600 | 1040 | 49000 | 92 |
| | 2 | | 40 | 1370 | 41200 | 1550 | 68000 | 127 |
| | 3 | | 50 | 1710 | 61100 | 1830 | 71000 | 138 |
| | 4 | 60 | 30 | 1320 | 45500 | 1130 | 45000 | 113 |
| | 5 | | 40 | 1540 | 50700 | 1610 | 76900 | 135 |
| | 6 | | 50 | 1850 | 70900 | 1950 | 85000 | 141 |
| | 7 | 70 | 50 | 2400 | 86100 | 2500 | 95000 | 180 |
| Comparative Experiment | 1 | 0 | 30 | 610 | 27000 | 1200 | 42000 | 70 |
| | 2 | | 40 | 780 | 37000 | 1400 | 50000 | 95 |
| | 3 | | 50 | 900 | 5000 | 1550 | 67000 | 120 |

| | Example | | Direction perpendicular to direction of arrangement | | | | |
|---|---|---|---|---|---|---|---|
| | | | Tensile (kg/cm$^2$) | Modulus of tensile (kg/cm$^2$) | Bending (kg/cm$^2$) | Modulus of bending (kg/cm$^2$) | Izod Impact (kg·cm/cm) |
| | Example | 1 | 410 | 19000 | 880 | 37100 | 35 |
| | | 2 | 490 | 20100 | 1300 | 54900 | 61 |
| | | 3 | 530 | 24100 | 1520 | 84000 | 78 |
| | | 4 | 400 | 18000 | 870 | 37000 | 36 |
| | | 5 | 480 | 19500 | 1300 | 53000 | 60 |
| | | 6 | 500 | 22000 | 1400 | 56000 | 70 |
| | | 7 | 450 | 19500 | 1200 | 50400 | 50 |
| | Comparative Experiment | 1 | | | | | |
| | | 2 | | | | | |
| | | 3 | | | | | |

It is noted from Table 1 that the stampable sheets according to the present invention possessed literally outstanding mechanical strength in the direction of arrangement of the arranged fibers.

EXAMPLE 8

Stampable sheets, A and B, were produced which contained swirled mats, arranged fibers, and thermoplastic resin in ratios indicated in Table 2.

In the production, bundles each consisting of 1,000 glass fibers 23 μm in diameter were used as arranged fibers and bundles each consisting of 100 glass fibers of the same diameter were used as fibers for swirled mats. Polypropylene resin was used as the thermoplastic resin.

TABLE 2

(% by weight)

| Sheet | Swirled mat | Arranged fibers | Thermoplastic resin | Remarks |
|---|---|---|---|---|
| A | 50 | — | 50 | Comparative experiment |
| B | 15 | 35 | 50 | Example of this invention |

Figure 5:
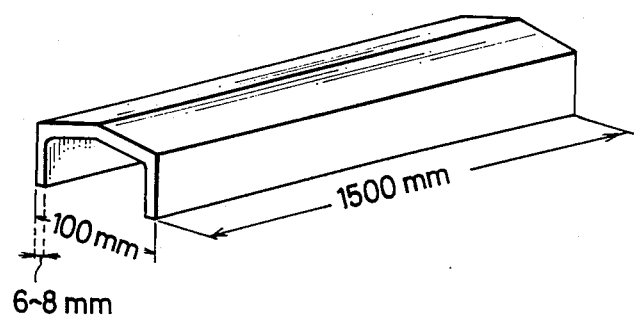
FIG. 5 is a perspective view of a bumper beam manufactured by a procedure described in Example 7.

Bumper beams, Nos. 1-3, of the shape illustrated in FIG. 5, were produced by stampable the stamping sheets A and B independently of each other and the two stampable sheets, A and B, in combination (weight 4.2 to 4.3 kg). These bumper beams were tested for load strength by the 3-point support compression method with a compression tester (produced by Shimazu Seisakusho Ltd. and marketed under product code of "IS-5000") under the following test conditions. The results were as shown in Table 3.

Test conditions

Cross head speed: 10 mm/min Cross head span: 890 mm

TABLE 3

| No. | Sheet used | Load Strength (ton) *1 | Improvement (%) *2 | Remarks |
|---|---|---|---|---|
| 1 | A (100%) | 1.4 | 100 | Comparative Experiment |
| 2 | B (100%) | 2.2 | 156 | Example of this invention |
| 3 | A/B = 40/60 (weight ratio) | 1.9 | 136 | |

*1 Average of n = 3
*2 Load of No. 1 taken as 100%

EXAMPLE 9

Figure 6:
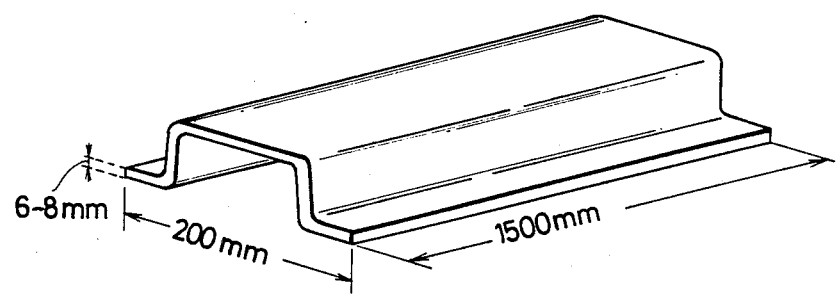
FIG. 6 is a perspective view of a bumper beam manufactured by a procedure described in FIG. 8.

Bumper beams, Nos. 4-6, were produced by following the procedure of Example 8, excepting the shape in which the bumper beams were formed was changed to that illustrated in FIG. 6. They were similarly tested for load strength. In the test, the cross head span was 830 mm. The results were as shown in Table 4.

TABLE 4

| No. | Sheet used | Load Strength (ton) *1 | Improvement (%) *2 | Remarks |
| --- | --- | --- | --- | --- |
| 4 | A (100%) | 1.5 | 100 | Comparative Experiment |
| 5 | B (100%) | 2.2 | 147 | Example of this invention |
| 6 | A/B = 40/60 (weight ratio) | 1.8 | 120 | |

It is noted from Table 3 and Table 4 that the bumper beams of the present invention possessed very high load strength, enjoying high strength and rigidity.

What is claimed is:

1. A composite fiber reinforced thermoplastic stampable sheet comprising:
    laminates, each including reinforcing fibers arranged in one direction and contained in the range of 30 to 80% by weight relative to the laminate, and a swirled fiber mat disposed adjacent to the reinforcing fibers and joined to the reinforcing fibers by needling, said laminate being contained in the range of 20 to 70% by weight relative to the stampable sheet, and
    a thermoplastic resin incorporated in said laminates by impregnation in the range of 30 to 80% by weight relative to the stampable sheet.

2. A composite fiber reinforced thermoplastic resin stampable sheet according to claim 1, wherein said laminate has a plurality of layers of said reinforcing fibers and a plurality of layers of said mats superposed symmetrically in the direction of thickness of said laminate.

3. A composite fiber reinforced thermoplastic resin stampable sheet according to claim 2, wherein said laminate has said oomponent layers superposed in such a manner that two fiber mat layers form the outermost layers of the laminate.

4. A composite fiber reinforced thermoplastic resin stampable sheet according to claim 1, wherein said thermoplastic resin is polypropylene, polyethylene terephthalate, polybutylene terephthalate, polyamide, or polyphenylene sulfide.

5. A composite fiber reinforced thermoplastic resin stampable sheet according to claim 1, wherein said fibers are glass fibers, carbon fibers, or aramid fibers.

6. A composite fiber reinforced thermoplastic resin stampable sheet according to claim 1, wherein said reinforcing fibers are formed of unsplit strands each having 100 to 2,000 filaments.

7. A composite fiber reinforced thermoplastic resin stampable sheet according to claim 1, wherein said fiber mats are formed of strands each having 200 to 2,000 filaments in an unsplit form or in a form split into not more than 8 pieces.

8. A composite fiber reinforced thermoplastic resin stampable sheet according to claim 1, wherein said swirls have a diameter in the range of 150 to 800 mm.

9. A bumper beam formed of a composite fiber reinforced thermoplastic stampable sheet, comprising:
    laminates, each including reinforcing fibers arranged in the longitudinal direction of the bumper and contained in the range of 30 to 80% by weight relative to the laminate, and a swirled fiber mat disposed adjacent to the reinforcing fibers and joined to the reinforcing fibers by needling, said laminate being contained in the range of 20 to 70% by weight relative to the stampable sheet, and
    a thermoplastic resin incorporated in said laminates by impregnation in the range of 30 to 80% by weight relative to the stampable sheet.

10. A bumper beam according to claim 9, further comprising a fiber reinforced thermoplastic resin sheet patched to the stampable sheet at a required portion, said thermoplastic resin sheet and the stampable sheet being integrally joined together when the stampable sheet is formed by impregnation with the thermoplastic resin.

11. A bumper beam according to claim 10, wherein said thermoplastic resin sheet contains swirled fiber mats in the range of 20 to 70% by weight relative to the thermoplastic resin sheet, and a thermoplastic resin in the range of 30 to 80% by weight relative to the thermoplastic resin sheet.

12. A bumper beam according to claim 11, wherein said stampable sheet is formed under pressure of not lower than 100 Kg per square cm.

13. A bumper beam according to claim 10, further comprising a cover member situated outside the stampable sheet, said cover member being made of a resin, and a filler situated between the cover member and the stampable sheet.

14. A composite fiber reinforced thermoplastic stampable sheet comprising:
    at least two laminates, each including reinforcing fibers arranged in one direction and contained in the range of 30 to 80% by weight relative to the laminate, and a swirled fiber mat disposed adjacent to the reinforcing fibers and joined to the reinforcing fibers by needling, said laminate being contained in the range of 20 to 70% by weight relative to the stampable sheet, and
    a thermoplastic resin in the range of 30 to 80% by weight relative to the stampable sheet, said thermoplastic resin being incorporated in said laminates by impregnation so that after two resin sheets are disposed outside the laminates and a molten resin is placed between the two laminates, the laminates and resin are heated and pressed.

* * * * *